United States Patent [19]

Yaba et al.

[11] Patent Number: 5,330,941
[45] Date of Patent: Jul. 19, 1994

[54] QUARTZ GLASS SUBSTRATE FOR POLYSILICON THIN FILM TRANSISTOR LIQUID CRYSTAL DISPLAY

[75] Inventors: Susumu Yaba; Shinya Kikugawa; Yukinori Ohta, all of Yokohama, Japan

[73] Assignee: Asahi Glass Company Ltd., Tokyo, Japan

[21] Appl. No.: 912,776

[22] Filed: Jul. 13, 1992

[30] Foreign Application Priority Data

Jul. 24, 1991 [JP] Japan .................................. 3-207486
Nov. 15, 1991 [JP] Japan .................................. 3-327149
Nov. 15, 1991 [JP] Japan .................................. 3-327150

[51] Int. Cl.$^5$ ................................................ C03C 3/00
[52] U.S. Cl. ........................................ 501/54; 501/53; 501/154; 428/1; 428/426
[58] Field of Search ................. 501/53, 54, 900; 428/426, 1; 65/900

[56] References Cited

U.S. PATENT DOCUMENTS

| 3,711,262 | 1/1973 | Keck et al. | 501/54 |
| 3,772,134 | 11/1973 | Rau | 501/54 |
| 3,776,809 | 12/1973 | Baumler et al. | 501/54 |
| 4,979,973 | 12/1990 | Takita et al. | 65/18.1 |
| 5,086,352 | 2/1992 | Yamagata et al. | 65/900 |
| 5,141,786 | 8/1992 | Shimizu et al. | 501/54 |

FOREIGN PATENT DOCUMENTS

| 1076933 | 3/1989 | Japan . |
| 2069332 | 3/1990 | Japan . |
| 3083833 | 4/1991 | Japan . |
| 3199133 | 8/1991 | Japan . |

Primary Examiner—Mark L. Bell
Assistant Examiner—M. A. Marcheschi
Attorney, Agent, or Firm—Oblon, Spivak, McClelland, Maier & Neustadt

[57] ABSTRACT

A quartz glass substrate for polysilicon thin film transistor liquid crystal display, in which a halogen content is not more than 10 ppm; an OH content is not more than 100 ppm; a total content of a heavy metal element and an alkali metal element is not more than 1 ppm; and an annealing point is not less than 1,150° C.

5 Claims, No Drawings

QUARTZ GLASS SUBSTRATE FOR POLYSILICON THIN FILM TRANSISTOR LIQUID CRYSTAL DISPLAY

BACKGROUND OF THE INVENTION

1. Field of the Invention

The present invention relates to a quartz glass substrate for polysilicon thin film transistor liquid crystal display.

2. Discussion of Background

Quartz glass has the most excellent heat resistance among transparent glass materials. Further, the quartz glass has an extremely small thermal expansion coefficient, and it is excellent in dimensional stability. Furthermore, the quartz glass is excellent in chemical durability. Therefore, in these days it is used as substrate material for polysilicon thin film transistor (hereinafter referred to simply as "TFT") liquid crystal display (hereinafter referred to simply as "LCD"), particularly for small-size polysilicon TFT LCD which is used for viewfinder of video camera. Processes for producing polysilicon TFT can be generally classified into three large groups by level of manufacturing temperature: (1) high temperature process (the maximum process temperature: about 1,000° C.), (2) medium temperature process (the maximum process temperature: about 700° C.) and (3) low temperature process (the maximum process temperature: about 500° C.).

Generally speaking, with respect to large area TFT such as television and display, developments in the direction of lowering the process temperature are widely proceeding from the viewpoint of manufacturing cost. On the other hand, with respect to small-size polysilicon TFT for viewfinder of video camera, etc., if a high temperature process is applied, a conventional LSI manufacturing line can be utilized without big modification, whereby highly reliable process technology developed in manufacturing LSI can be effectively used and a high quality TFT can be produced with a high yield. Thus, a high temperature process is dominant.

A problem here is heat resistance of glass used as substrate. From this viewpoint, quartz glass is usually used as substrate. As practical evaluation method for heat resistance, there is a method wherein deformation degree of a shape in actual use is measured and evaluated. (For example, a substrate having a predetermined thickness, width and length is placed on a jig having a predetermined span and subjected to heat history of a predetermined temperature and time, whereby deformation in warp is measured.) Although this method is simple, it is difficult to make quantitative evaluation as properties of material. On the other hand, as a method for evaluating heat resistance as properties of materials, there is a method wherein evaluation is made in accordance with temperature dependency of viscosity of a material. Since viscosity deformation is dominant with respect to heat resistance of quartz glass at least 1,000° C., this evaluation method is appropriate as evaluation method for properties of materials. Further, so far as quartz glass is concerned, a slope of temperature dependency of viscosity is considered to be substantially constant within a range of from 1,000 to 1,200° C. Thus, a temperature at which a viscosity is a certain value, for example, a temperature at which the viscosity is $10^{13}$ poise (annealing point), can be applied as index. As specific measurement method, a conventional method of beam bending method can be applied.

Heat resistance of quartz glass is considerably different depending on kinds and manufacturing processes. Among quartz glass, so-called fused quartz glass having an annealing point of about from 1,170° to 1,220° C., is the most excellent in heat resistance.

Whereas, a substrate comprising synthetic quartz glass is far excellent in quality, for example, in view of bubbles and foreign substances contained in the glass, while an annealing point of synthetic quartz glass is generally about from 1,050° C. to 1,120° C., which is lower by about from 100° C. to 150° C. than fused quartz glass. Accordingly, there have been problems in a substrate comprising synthetic quartz glass when used for polysilicon TFT because of lower heat resistance. Further, it has been known that quartz glass usually has structural defects by which absorption in a wavelength of from 230 to 300 nm occurs with irradiation of ultraviolet under vacuum such as plasma etching applied in TFT manufacturing step. Among these structural defects, there is a case wherein fluorescent emission is observed, whereby such a practical problem arises that color tone is injured when such glass is used for color liquid crystal display elements.

When quartz glass is used for such optical use, optical homogeneity is required. As factors controlling this optical homogeneity (which is usually indicated by variation of refractive index $\Delta n$), ① thermal distortion and ② change of composition exist. Thermal distortion can be removed by annealing glass sufficiently. However, if an element which causes to change refractive index, is contained in glass, it is difficult to obtain high homogeneity because of the element. For example, G. Hetherington et al. (Physics and Chemistry of Glasses 3 (1962) No. 4, p129) have reported that OH contained in quartz glass gives the quartz glass a variation of about $1\times10^{-6}/10$ ppmOH. Likewise, it is reported that Cl contained in quartz glass gives the quartz glass a variation about $1\times10^{-6}/10$ ppmCl (Susa et al. (Journal of non-crystalline solid 79 (1986) p165-176)). Accordingly, to attain such homogeneity that a variation of refractive index is not more than $5\times10^{-6}$, it is readily considered that variation range of the OH and Cl contents is reduced and the OH and Cl contents are uniformly distributed throughout the quartz glass. However, for quartz glass which is produced by a process wherein a glass-forming raw material is subjected to flame hydrolysis to form a porous glass product, followed by vitrification, or quartz glass which is produced by a process wherein a glass-forming raw material is subjected to heat hydrolysis and quartz glass is directly deposited on a substrate, it is difficult to uniform the distribution of OH throughout the quartz glass due to influence of e.g. temperature distribution when produced.

A method which is considered next is to reduce an absolute amount of OH contained in quartz glass. It is known that an amount of OH in quartz glass produced by a process wherein a porous quartz glass product is subjected to vitrification, is reduced by treating the porous glass product with a halogen compound such as $Cl_2$, $CCl_4$, $NH_4F$ or HF, as means for producing optical fibers having a low transmission loss. However, the glass produced by the process has a halogen element distributed therein, which brings about a variation of refractive index.

Furthermore, Japanese Unexamined Patent Publication No. 102139/1990 discloses a method to improve homogeneity with a downwardly convex distribution of the OH concentration in the quartz glass. According to this method, in order to form the downwardly convex OH distribution in the quartz glass, it is required to precisely control thermal treatment conditions. Further, the method disclosed in Japanese Unexamined Patent Publication No. 102139/1990 can not be substantially applied to quartz glass produced by way of a porous quartz glass product by a vapor phase reaction, because an upwardly convex OH distribution is formed in the quartz glass.

It is an object of the present invention to solve the above problems and to provide a polysilicon TFT LCD quartz glass substrate excellent in heat resistance and suitable for manufacture of polysilicon TFT LCD which is used for viewfinder, etc. It is another object of the present invention to solve the above problems and to provide a polysilicon TFT LCD quartz glass substrate which is substantially absent from fluorescent emission.

SUMMARY OF THE INVENTION

The present invention has been made to solve the above-mentioned problems and provides a quartz glass substrate for polysilicon TFT LCD, in which a halogen content is not more than 10 ppm; a OH content is not more than 100 ppm; a total content of a heavy metal element and an alkali metal element is not more than 1 ppm; and an annealing point is not less than 1,150° C. (Throughout the specification, "ppm" means "ppm by weight".) Further, the present invention provides the above-mentioned substrate, in which a variation of refractive index thereof is not more than $5 \times 10^{-6}$.

Here, the variation of refractive index thereof means a distribution range of refractive index values measured by using incident light perpendicular to the substrate.

Furthermore, the present invention provides a quartz glass substrate for polysilicon thin film transistor liquid crystal display, in which an aluminum content is 5–40 ppm; a halogen content is not more than 10 ppm; an OH content is not more than 100 ppm; a total content of a heavy metal element and an alkali metal element is not more than 1 ppm; and an annealing point is not less than 1,180° C.

DETAILED DESCRIPTION OF THE PREFERRED EMBODIMENTS

According to the present invention, an amount of a halogen element contained in quartz glass substrate is preferably not more than 10 ppm. If the amount exceeds 10 ppm, heat resistance is reduced, such being undesirable. Further, an amount of OH is preferably not more than 100 ppm, more preferably not more than 50 ppm. If the amount exceeds 100 ppm, heat resistance is reduced as in the case of halogen element, such being undesirable.

With respect to amounts of a heavy metal element and an alkali metal element, their total amount is preferably not more than 1 ppm. If the total amount exceeds 1 ppm, spectral transmittance in a short wavelength region is decreased, such being undesirable. Here, the heavy metal element means an element usually called "heavy metal element" and includes, for example, Fe, Cr, Ni, Co, Ti, Cu, Zr, etc. Further, an annealing point, which is a temperature at which a viscosity of glass is $10^{13}$ poise, is preferably not less than 1,150° C. If glass has an annealing point at least 1,150° C., 1,000° C. can be applied as process temperature for producing polysilicon TFT, such being desirable.

To attain optical homogeneity, a variation of refractive index within the substrate is preferably not value, it is difficult to maintain optical homogeneity, such being undesirable.

Further, an increase in absorption coefficient is preferably not more than 0.005 cm$^{-1}$ in a range of from 230 to 300 nm before and after a plasma etching treatment. Here, the absorption coefficient $\alpha$ (cm$^{-1}$) is defined as follows:

$$I/I_0 = (1-R)^2 \cdot \exp(-\alpha \cdot t)$$

wherein I is an amount of transmitting light, $I_0$ is an amount of incident light, R is reflectance and t is a thickness of glass substrate (cm).

If an increase of absorption coefficient is not more than 0.005 cm$^{-1}$ fluorescent emission caused by the increase is from one 100,000th to 1,000,000th of the incident light, whereby no actual problem arises. If quartz glass in which the increase exceeds the above value, is used for TFT LCD substrate, such problems arises that color tone of image on TFT LCD is changed or colored, such being undesirable.

There is no particular restriction as to production of quartz glass according to the present invention so long as the above-mentioned requirements are satisfied. For example, quartz glass according to the present invention can be produced as follows:

A glass-forming raw material is subjected to heat hydrolysis, and quartz glass fine particles thus obtained is let to deposit and grow on a substrate. Then, the porous quartz glass products thus obtained is maintained in an atmosphere of low water vapor partial pressure in a range under a transparent vitrification temperature for a certain time under heating. Then, the temperature is raised to a transparent vitrification temperature, whereby the porous quartz glass product is subjected to transparent vitrification to obtain a quartz glass product.

As glass-forming raw material to be used in the present invention, there is no particular restriction so long as gasification is possible. However, from the viewpoint of workability and cost, halogenated silicon compound, for example, chlorides such as SICl$_4$, SiHCl$_3$, SiH$_2$Cl$_2$ and Si(CH$_3$)Cl$_3$, fluorides such as SiF$_4$, SiHF$_3$ and SiH$_2$F$_2$, bromides such as SiBr$_4$ and SiHBr$_3$ and iodides such as SiI$_4$, may be mentioned. The glass-forming raw material is subjected to hydrolysis in oxyhydrogen flame as usual and deposited on a substrate to obtain a porous quartz glass product. The porous quartz glass product thus obtained is maintained in a low water vapor partial pressure atmosphere for a certain time under heating, and then the temperature is raised to a transparent vitrification temperature, followed by vitrification to obtain quartz glass.

Namely, a porous product is, for example, fitted in an electric furnace capable of controlling an atmosphere, and is heated at a constant raising temperature rate. After reaching a predetermined temperature, a dry gas is introduced to replace the atmosphere for the porous products, whereby a water vapor partial pressure can be reduced to less than a predetermined value. The water vapor partial pressure is preferably not more than 0.002 mmHg. If the pressure exceeds 0.002 mmHg, it becomes difficult to reduce the amount of OH in the quartz glass finally obtained, such being undesirable.

As the temperature range at which the porous product is maintained under heating, a range of from 800° to 1,250° C. is preferred. If the temperature is less than 800° C., substantial effects can not be obtained, such being undesirable. On the other hand, if the temperature exceeds 1,250° C., vitrification on a surface of the porous product proceeds, and inner surface of the porous product can not be replaced with a desired low water vapor partial pressure, such being undesirable.

Further, so long as the temperature is within the above range, the temperature for the heat treatment, may be maintained at a certain temperature or raised within the temperature range for a predetermined time. The maintaining time within the temperature range depends on the maintaining temperature and can not be specifically defined. For example, the time is preferably about from 1 to 30 hours. If the time is less than one hour, substantial effect can not be obtained. On the other hand, even though the time is longer than 30 hours, effects thus obtained is substantially the same as in the above range, and it is not preferred when production efficiency is took into consideration.

As dry gas to be used in the present invention, nitrogen, helium, argon, etc, are usually used. However, the dry gas is not restricted to these gases so long as it can be used as dry gas. After the heat treatment, the porous glass product is heated to a vitrification temperature and subjected to vitrification. The vitrification temperature is suitably selected from the range of from 1,350° to 1,500° C. Further, the heat treatment and the vitrification treatment can be conducted by using different heating apparatus. In this case, it is preferred to take means such as to prevent adsorption of moisture during transference. Thus, as further preferred embodiment, the heat treatment and the vitrification treatment is conducted by using the same apparatus.

The quartz glass product thus obtained is heated at a temperature at least a softening point and subjected to molding into a desired shape to obtain quartz glass ingot. The molding temperature is preferred from 1,650° to 1,800° C. If the temperature is less than 1,650° C., self-weight deformation can not be substantially conducted because a viscosity of the quartz glass is too high and a cristobalite phase ($SiO_2$ crystal phase) grows and devitrification proceeds, such being undesirable. On the other hand, if the temperature exceeds 1,800° C., sublimation of $SiO_2$ can not be ignored, such being undesirable. Further, there is no particular restriction as to the direction to which the self-weight deformation of the quartz glass is conducted, and the direction is preferably the same as the direction to which the porous glass substrate grows.

The quartz glass ingot thus obtained, is further subjected to a grinding process, slicing process and polishing process to obtain a substrate. In order to improve the transmittance, a substrate after the slicing process may be subjected to a heat treatment in an atmosphere containing hydrogen, if necessary.

The quartz glass substrate obtained by the abovementioned steps contains no more than 100 ppm of OH content. Thus, although distribution of OH in the glass exists, the absolute value of variation of the OH content is as low as ±5 ppm in almost all the ranges because the absolute value of the OH content is very low. Further, because no dehydration procedure by a halogen compound is conducted, a halogen content in the quartz glass is derived only from the halogenated silicon compound as starting material. Thus, the halogen content is as low as not more than 10 ppm. As a result, the quartz glass thus obtained is excellent in homogeneity wherein the variation of refractive index caused by the change of the OH content is extremely small.

Furthermore, the quartz glass of the present invention has such an extremely high purity that the total content of impurities of heavy metal elements such as iron, nickel, etc. and alkali metal elements such as sodium, potassium, etc. is not more than 1 ppm because synthetic raw materials having a high purity can be used, as glass-forming raw material and no fusion step is included, whereby no impurities from a crucible are included. Thus, when the quartz glass according to the present invention is used for polysilicon TFT, no diffusion of impurities to a silicon layer or other parts occurs even after a high temperature treatment, whereby the silicon layer and other parts are not deteriorated.

Furthermore, the present invention provides a quartz glass substrate for polysilicon TFT LCD, in which an aluminum content is from 5 to 40 ppm, a halogen content is not more than 10 ppm, an OH content is not more than 100 ppm, a total content of a heavy metal element and an alkali metal element is not more than 1 ppm, and an annealing point is not less than 1,180° C.

Yet furthermore, the present invention provides the above-mentioned substrate, in which a variation of refractive index thereof is not more than $5 \times 10^{-6}$.

In order to improve heat resistance of a quartz glass having a high purity to a level of quality as in fused quartz glass, the present inventors have conducted extensive research on causes of the difference in heat resistance. As a result, the present inventors have found that an addition of specific elements, particularly aluminum is extremely effective to improve heat resistance (Japanese Unexamined Patent Publication No. 46020/1992). The present inventors have conducted further extensive study, and newly found that it is useful as substrate material for polysilicon TFT LCD.

According to the present invention, an amount of aluminum contained in the quartz glass substrate is preferably from 5 to 40 ppm. If the amount is less than 5 ppm, improvement of heat resistance can not be attained, such being undesirable. On the other hand, even though the amount is more than 40 ppm, improvement of heat resistance is substantially the same as in quartz glass having an aluminum content within the above range, such being undesirable in view of practical use.

An amount of a halogen element contained in quartz glass substrate is preferably not more than 10 ppm. If the amount exceeds 10 ppm, heat resistance is reduced, such being undesirable. Further, an amount of OH is preferably not more than 100 ppm, more preferably not more than 50 ppm. If the amount exceeds 100 ppm, heat resistance is reduced as in the case of the halogen element, such being undesirable.

With respect to amounts of a heavy metal element and an alkali metal element, their total amount is preferably not more than 1 ppm. If the total amount exceeds 1 ppm, adverse effects such as diffusion of impurities in a device are exerted, such being undesirable. Further, an annealing point, which is a temperature at which a viscosity of glass is $10^{13}$ poise, is preferably not less than 1,180° C. If glass has an annealing point at least 1,180° C., 1,000° C. can be applied as process temperature for producing polysilicon TFT, such being desirable.

To attain optical homogeneity, a variation of refractive index within the substrate is preferably not more than $5 \times 10^{-6}$. If the variation exceeds the above value, it is difficult to maintain optical homogeneity, such being undesirable.

There is no particular restriction as to production of quartz glass according to the present invention so long as the above-mentioned requirements are satisfied. For example, quartz glass according to the present invention can be produced as follows:

A glass-forming raw material is subjected to heat hydrolysis, and quartz glass fine particles thus obtained is let to deposit and grow on a substrate. Then, aluminium is added to the porous quartz glass products thus obtained and is maintained in an atmosphere of low water vapor partial pressure in a range under a transparent vitrification temperature for a certain time under heating. Then, the temperature is raised to a transparent vitrification temperature, whereby the porous quartz glass product is subjected to transparent vitrification to obtain a quartz glass product.

As glass-forming raw material to be used in the present invention, there is no particular restriction so long as gasification is possible. However, from the viewpoint of workability and cost, halogenated silicon compound, for example, chlorides such as $SiCl_4$, $SiHCl_3$, $SiH_2Cl_2$ and $Si(CH_3)Cl_3$, fluorides such as $SiF_4$, $SiHF_3$ and $SiH_2F_2$, bromides such as $SiBr_4$ and $SiHBr_3$ and iodides such as $SiI_4$, may be mentioned. The glass-forming raw material is subjected to hydrolysis in oxyhydrogen flame as usual and deposited on a substrate to obtain a porous quartz glass product.

Then, a solution containing an aluminum raw material is impregnated in the porous quartz glass product thus obtained, and a material containing aluminum is precipitated in the porous product, followed by drying. As impregnating solution, for example, an alcohol solution of aluminum chloride and aluminum alkoxide compounds, etc. may be used. Further, as a case requires, an acid or a volatile alkali compound such as ammonium hydroxide is added thereto as catalyst for precipitation.

In the above method for adding aluminum, an amount to be added can be controlled by a concentration of an aluminum solution. Of course, instead of using the above method, an aluminum compound may be added to a gas of a raw material when a porous product is deposited. The porous quartz glass product containing an aluminum compound thus obtained is maintained in a low water vapor partial pressure atmosphere for a certain time under heating, and then the temperature is raised to a transparent vitrification temperature, followed by vitrification to obtain quartz glass.

Namely, a porous product is, for example, fitted in an electric furnace capable of controlling an atmosphere, and is heated at a constant raising temperature rate. After reaching a predetermined temperature, a dry gas is introduced to replace the atmosphere for the porous products, whereby a water vapor partial pressure can be reduced to less than a predetermined value. The water vapor partial pressure is preferably not more than 0.002 mmHg. If the pressure exceeds 0.002mmHg, it becomes difficult to reduce the amount of OH in the quartz glass finally obtained, such being undesirable.

As the temperature range at which the porous product is maintained under heating, a range of from 800° to 1,250° C. is preferred. If the temperature is less than 800° C., substantial effects can not be obtained, such being undesirable. On the other hand, if the temperature exceeds 1,250° C., vitrification on a surface of the porous product proceeds, and inner surface of the porous product can not be replaced with a desired low water vapor partial pressure, such being undesirable.

Further, so long as the temperature is within the above range, the temperature for the heat treatment, may be maintained at a certain temperature or raised within the temperature range for a predetermined time. The maintaining time within the temperature range depends on the maintaining temperature and can not be specifically defined. For example, the time is preferably about from 1 to 30 hours. If the time is less than one hour, substantial effect can not be obtained. On the other hand, even though the time is longer than 30 hours, effects thus obtained is substantially the same as in the above range, and it is not preferred when production efficiency is took into consideration.

As dry gas to be used in the present invention, nitrogen, helium, argon, etc, are usually used. However, the dry gas is not restricted to these gases so long as it can be used as dry gas. After the heat treatment, the porous glass product is heated to a vitrification temperature and subjected to vitrification. The vitrification temperature is suitably selected from the range of from 1,350° to 1,500° C. Further, the heat treatment and the vitrification treatment can be conducted by using different heating apparatus. In this case, it is preferred to take means such as to prevent adsorption of moisture during transference. Thus, as further preferred embodiment, the heat treatment and the vitrification treatment is conducted by using the same apparatus.

The quartz glass product thus obtained is heated at a temperature at least a softening point and subjected to molding into a desired shape to obtain quartz glass ingot. The molding temperature is preferred from 1,650° to 1,800° C. If the temperature is less than 1,650° C. self-weight deformation can not be substantially conducted because a viscosity of the quartz glass is too high and a cristobalite phase ($SiO_2$ crystal phase) grows and devitrification proceeds, such being undesirable. On the other hand, if the temperature exceeds 1,800° C., sublimation of $SiO_2$ can not be ignored, such being undesirable. Further, there is no particular restriction as to the direction to which the self-weight deformation of the quartz glass is conducted, and the direction is preferably the same as the direction to which the porous glass substrate grows.

The quartz glass ingot thus obtained, is further subjected to a grinding process, slicing process and polishing process to obtain a substrate.

The quartz glass substrate obtained by the above-mentioned steps contains from 5 to 40 ppm of aluminum, no more than 10 ppm of halogen content (due to no procedure of dehydration by a halogen compound), and no more than 100 ppm of OH content. Further, variation of the OH content is as low as ±5 ppm in almost all the ranges. Thus, the quartz glass thus obtained is excellent in homogeneity.

Furthermore, the quartz glass of the present invention has such an extremely high purity that the total content of impurities of a heavy metal element such as iron, nickel, etc. and an alkali metal element such as sodium, potassium, etc. is not more than 1 ppm. Thus, when the quartz glass according to the present invention is used for polysilicon TFT, no diffusion of impurities to a silicon layer or other parts occurs even after a high temperature treatment, whereby the silicon layer and other parts are not deteriorated.

Now, the present invention will be described with reference to Examples. However, it should be understood that the present invention is by no means restricted by these specific Examples.

EXAMPLE 1

A porous quartz glass product having diameter of 35 cm and a length of 100 cm which was obtained by subjecting SiCl₄ to heat hydrolysis in oxyhydrogen flame in accordance with a conventional method, was fitted in an electric furnace capable of controlling an atmosphere at room temperature. Then, the atmosphere in the electric furnace was replaced with nitrogen gas having dew point of −70° C. and the temperature was raised to 1,000° C. at a temperature rising rate of 500° C./hr while supplying nitrogen gas having a dew point of −70° C. Here, the dewpoint of −70° C. corresponds to a water vapor partial pressure of 0.002 mmHg.

The temperature was continued to raise to 1,250° C. at temperature rising rate of 50° C./hr, and maintained for 10 hours at 1,250° C. The heat-treated porous quartz glass substrate thus obtained was placed on an upper part of the electric furnace wherein the maximum inner temperature is controlled to be 1,450° C. for transparent vitrification, and the interior of the furnace was replaced with helium gas having a dew point of −70° C. Then, the porous quartz glass product was let go down through the maximum temperature region at a rate of 80 cm/hr, whereby transparent vitrification was conducted. The reason for using helium gas having a dew point of −70° C. here is to prevent moisture from being adsorbed again on the porous quartz glass substrate although the OH content in the porous quartz glass substrate is reduced by the heat treatment up to 1,250° C. as mentioned above.

The transparent quartz glass thus obtained was heated to a temperature of more than the softening point of 1,750° C. in an electric furnace having a carbon heating element and self-weight deformation was conducted, followed by molding into a cylindrical ingot of 170ϕ×400 mm. Quartz glass ingot having 170ϕ×57 mm was cut out from the center of the longitudinal direction of the quartz glass ingot and subjected to cylindrical grinding to have 160ϕ in order to make the shape uniform. A refractive index distribution of the ingot was measured by precision type interferometer (Zygo IV) and homogeneity was evaluated in view of a variation range of refractive index Δn.

With respect to an OH content distribution, a glass plate having a thickness of 2 mm was cut out from a next portion in the quartz glass ingot of 170ϕ×400 mm where the refractive index distribution was evaluated as mentioned above, and an OH content distribution was determined by absorption at 3,700 cm⁻¹ by means of easy FTIR apparatus manufactured by Nihon Bunko Company. A Cl content was determined by means of an ion chromatography method after the quartz glass obtained was subjected to alkali fusion. Contents of aluminum, alkali metal elements (N, K) and heavy metal elements (Fe, Ni, Ti) were determined by an atomic absorption method after the quartz glass obtained was washed with hydrofluoric acid and subjected to hydrofluoric acid decomposition. An annealing point was measured by means of beam bending method with a span of 52 mm by using a sample cut into a size of 2.4 mm×5 mm×60 mm. The results thus obtained are shown in Table 1.

Further, a sample was cut out from the above quartz glass ingot and subjected to a heat treatment at 1,000° C for 14 hours in 100% hydrogen atmosphere, followed by polishing to make the thickness uniformly 30 mm and measuring transmittance. Then, the sample was subjected to plasma etching in oxygen/carbon tetrachloride plasma (0.35 torr, 200 W) for 5 minutes by means of dry etcher (S-600) manufactured by Tokyo Oka, and transmittance was again measured. A decrease of the transmittance in a range of from 230 to 300 nm before and after the plasma etching treatment was 0.5%. Calculated from this value, an increase of absorption coefficient was 0.002 cm⁻¹.

EXAMPLE 2

A sample was cut out from quartz glass ingot prepared in the same manner as in Example 1 and the same after-treatment as in Example 1 was conducted except that the hydrogen concentration in the hydrogen atmosphere was 30%. A variation of transmittance before and after the plasma etching was measured and a decrease of transmittance was 1%. Calculated from the value, an increase of absorption coefficient was 0.004 cm⁻¹.

EXAMPLE 3

A porous quartz glass product having a diameter of 35 cm and a length of 100 cm obtained by subjecting SiCl₄ to heat hydrolysis in oxyhydrogen flame in accordance with a conventional method, was calcined at 1,200° C. to make the density uniform, and 0.005 wt % ethyl alcohol solution of anhydrous aluminum chloride was impregnated thereto under vacuum. Then, it was maintained at 100° C. for 5 hours while introducing air containing moisture having a saturated water vapor pressure at room temperature, followed by drying. Then, the sample thus obtained was fitted in an electric furnace capable of controlling an atmosphere at room temperature. Then, the atmosphere in the electric furnace was replaced with nitrogen gas having dew point of −70° C. and the temperature was raised to 1,000° C. at a temperature rising rate of 500° C./hr while supplying nitrogen gas having a dew point of −70° C.

The temperature was continued to raise to 1,250° C. at temperature rising rate of 50° C./hr, and maintained for 10 hours at 1,250° C. The heat-treated porous quartz glass substrate thus obtained was placed on an upper part of the electric furnace wherein the maximum inner temperature is controlled to be 1,450° C. for transparent vitrification, and the interior of the furnace was replaced with helium gas having a dew point of −70° C. Then, the porous quartz glass product was let go down through the maximum temperature region at a rate of 80 cm/hr, whereby transparent vitrification was conducted.

The transparent quartz glass thus obtained was heated to a temperature of more than the softening point of 1,750° C. in an electric furnace having a carbon heating element and self-weight deformation was conducted, followed by molding into a cylindrical ingot of 170ϕ×400 mm. Quartz glass ingot having 170ϕ×57 mm was cut out from the center of the longitudinal direction of the quartz glass ingot and subjected to cylindrical grinding to have 160ϕ in order to make the shape uniform. A refractive index distribution of the ingot was measured by precision type interferometer (Zygo IV) and homogeneity was evaluated in view of a variation range of the refractive index Δn.

With respect to an OH content distribution, a glass plate having a thickness of 2 mm was cut out from a next portion in the quartz glass ingot of 170φ×400 mm where the refractive index distribution was evaluated as mentioned above, and an OH content distribution was determined by absorption at 3,700 cm$^{-1}$ by means of easy FTIR apparatus manufactured by Nihon Bunko Company. A Cl content was determined by means of an ion chromatography method after the quartz glass obtained was subjected to alkali fusion. Further, an aluminum content was determined by an atomic absorption method after the quartz glass obtained was washed with hydrofluoric acid and subjected to hydrofluoric acid decomposition. Contents of alkali metal elements (Na, K) and heavy metal elements (Fe, Ni, Ti) were also determined in the same manner as in the aluminum content. Further, an annealing point was measured by beam bending method with a span of 52 mm by using a sample cut into a size of 2.4 mm×5 mm×60 mm. The results thus obtained are shown in Table 1.

COMPARATIVE EXAMPLE

Quartz glass ingot was prepared in the same manner as in Example 3 except that no aluminum was added and no heat treatment at 1,250° C. was conducted. The refractive index distribution (homogeneity), OH content distribution, Cl content, contents of Al, N, K, Fe, Ni and Ti and annealing point thus obtained are shown in Table 1.

TABLE 1

| | Al content (ppm) | OH content (ppm) | Cl content (ppm) | Na content (ppm) | K content (ppm) | Fe content (ppm) | Ni content (ppm) | Ti content (ppm) | Homogeneity (Δn) | Annealing point (°C.) |
|---|---|---|---|---|---|---|---|---|---|---|
| Example 1 | <1 | 40 ± 5 | <10 | <0.05 | <0.1 | <0.01 | <0.001 | n.d.* | $1.0 \times 10^{-6}$ | 1,170 |
| Example 3 | 20 | 10 ± 2 | <10 | <0.05 | <0.05 | <0.01 | <0.001 | 0.001 | $1.0 \times 10^{-6}$ | 1,200 |
| Comparative Example | <1 | 200 ± 20 | <10 | <0.05 | <0.05 | <0.01 | <0.001 | n.d. | $2.5 \times 10^{-6}$ | 1,120 |

*n.d.: not detected

As shown in Table 1, in Comparative Example 1 wherein no heat treatment at 1,250° C. was conducted, the OH content is as much as 200 ppm as compared with Example 1, and the annealing point is as low as 1,120° C. The variation of refractive index Δn showing a degree of homogeneity in Comparative Example is inferior as compared with Example 1 because the OH content in the glass is large, whereby the OH content is widely distributed. The annealing point is further improved in Examples 3 by addition of aluminum.

As mentioned above, the quartz glass substrate for polysilicon TFT LCD of the present invention has such excellent properties that an annealing point is high, heat resistance is excellent, an increase of absorption coefficient is small in a short wavelength region of visible light before and after a plasma etching treatment and substantially no fluorescent emission is observed. Further, the quartz glass substrate for polysilicon TFT LCD of the present invention has also excellent properties in optical homogeneity.

What is claimed is:

1. An optically homogeneous quartz glass substrate for polysilicon thin film transistor liquid crystal displays, having an aluminum content of 5–40 ppm; a halogen content of not more than 10 ppm; an OH content of not more than 100 ppm; a total content of a heavy metal element and an alkali metal element of not more than 1 ppm; and an annealing point of not less than 1,180° C.

2. The substrate according to claim 1, having a variation in refractive index thereof is not more than $5 \times 10^{-6}$ throughout.

3. The substrate according to claim 1 having an absorption coefficient which does not increase more than 0.005 cm$^{-1}$ in the range of from 230 to 300 nm after a plasma etching treatment.

4. The substrate according to claim 2, having an absorption coefficient which does not increase more than 0.005 cm$^{-1}$ in the range of from 230 to 300 nm after a plasma etching treatment.

5. The substrate according to claim 1, wherein said substrate is transparent.

* * * * *